UNITED STATES PATENT OFFICE 2,678,273

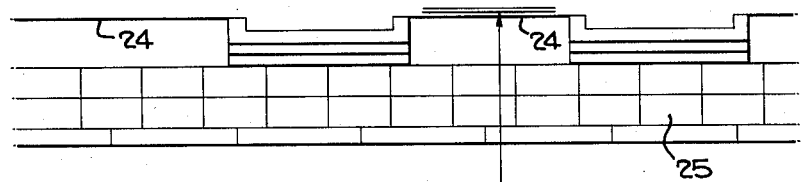
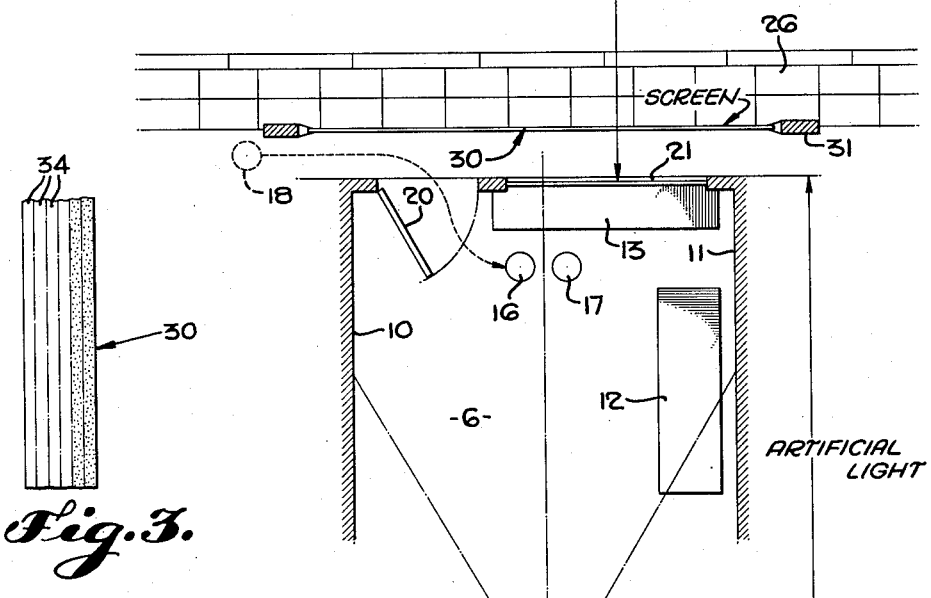
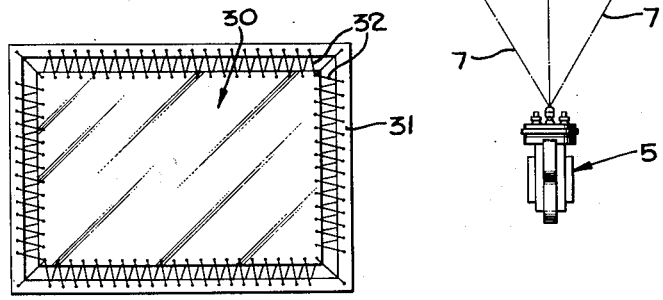

PHOTOGRAPHIC LIGHT BALANCING METHOD

James A. Gibbons, North Hollywood, Calif., assignor to Warner Brothers Pictures, Inc., Burbank, Calif., a corporation of Delaware Original application July 26, 1948, Serial No. 40,666. Divided and this application May 14, 1949, Serial No. 93,339

3 Claims. (Cl. 95—5)

This invention relates to screens, and particularly to light intensity reducing screens for balancing the intensity of two light sources. This application is a division of Serial No. 40,666, filed July 26, 1948, now Patent No. 2,558,243 claiming the light filter screen.

In the art of motion picture production, many scenes within the camera viewing angle are illuminated by a combination of daylight and artificial light, or parts of the scene are illuminated with daylight and other parts with artificial light. For instance, in the photographing of an indoor scene of a room, the camera angle may include a portion of the interior illuminated by normal artificial light and a window or door through which an outside area is seen by the camera, the outdoor area being illuminated by intense sunlight. Under these conditions, the outside area has a very strong illumination, and it is impractical to illuminate the interior to the same intensity for several reasons, such as the necessity for many lamps, the elimination of detail in the shadows, and inconvenience to the actors. However, by reducing the light intensity from the outside area, the indoor area may be artificially illuminated in the normal manner, and the film will be properly exposed, and thus, provide a better quality picture.

The present invention, therefore, is directed to a neutral density light reducing screen which reduces the light over all wave lengths of the visible spectrum in equal amounts, so that the exposure of the outside area and interior will have the same definition and proper proportioning in the finished print. Such a screen is one in which dye is applied and absorbed by the screen, the dye absorbing the light, and thus, producing the reduction in light reaching the camera film. The screen is made of multiple coats of plastic material, is light, tough, and, when mounted in its frame, may be easily moved about to the desired locations.

The principal object of the invention, therefore, is to facilitate the obtaining of light intensity balances between areas having different illuminations.

Another object of the invention is to provide an improved method of balancing the light intensity between various areas having different illuminations.

A further object of the invention is to provide an improved method of illuminating or lighting a scene to be photographed, and having different illumination in portions thereof, to provide optimum light intensities for the photographic emulsion.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a diagrammatic view showing one use of the invention.

Fig. 2 is an elevational view of the screen mounted in its frame, and

Fig. 3 is an enlarged cross-sectional view illustrating the construction of the screen.

Referring now to the drawings, a camera 5 is set up within an interior 6, the camera viewing angle being within the dot-and-dash lines 7. The scene within the angle may constitute the walls 10 and 11 of a room, counters or tables 12 and 13, and actors 16 and 17, the actor 16 walking from the position 18 to the position 16 during the sequence. The room has a door 20 and a window 21, the camera, of course, photographing viewable objects through the door and window, such as a building 24 and sidewalks 25 and 26, the sidewalks being on the sides of a street 27. In photographing such a scene, it is obvious that the camera will not only see the interior, but also the exterior through door 20 and window 21, and that the exterior may be illuminated by intense daylight, while the interior is illuminated by artificial light. If sufficient artificial light were supplied to the interior to balance the intense daylight of the exterior, the interior light would be so intense as to be impractical for the reasons mentioned above. Thus, to permit the use of normal artificial light, the street light is reduced by the positioning of a screen 30 in front of the door and window, which screen is made in accordance with the invention.

Referring now to Fig. 2, the screen 30 is mounted in the usual manner within a rigid frame 31 and laced by rubber bands or cords 32 through gromets in the screen and holes in the frame.

Referring now to Fig. 3, the screen is shown for purposes of illustration as made up of a plurality of coats or layers 34, in which the two last layers on the right are shown impregnated by a dye. Although the dye is shown in only these layers, it is to be understood that it may extend to only one layer or into more than two layers in accordance with the amount of light reduction required. Furthermore, since each layer or coat is of the same material, there is actually no line of separation between layers, the screen being homogeneous.

Referring now to the actual construction of the screen, it is built up in layers or coats, each coat being applied as a solution to a pre-prepared matrix made in accordance with my co-pending application, Ser. No. 40,667, filed July 26, 1948, now Patent No. 2,558,244. The screen is made of a formula which I refer to as M-3, and given hereinafter, the dye being applied after the required number of coats have been applied to build the screen up to the desired thickness. For instance, the base solution is first placed in a dip-pan and the surface of a matrix on a cylindrical drum is passed therethrough to apply each coat, which is dried before the application of the next coat. The base is generally of sufficient tensile strength and toughness after the application of six coats, which provides a screen of substantially .007 inch thick. The formula for the base layers is as follows:

| | | |
|---|---|---|
| Ethyl cellulose | gms | 744 |
| Xylol | cc | 3468 |
| Ethylene glycol monomethyl ether | cc | 827 |
| Butyl alcohol | cc | 827 |
| Methyl isobutyl ketone | cc | 827 |
| Methyl phthalyl ethyl glycollate | cc | 48 |

The above formula is adjusted to a viscosity of 42 at 24 degrees C., the application speed for a drum of approximately five feet, ten inches in diameter, being one revolution in sixteen minutes. The formula for the dye coat solvents is as follows:

| | Cc. |
|---|---|
| Benzyl alcohol | 150 |
| Butyl alcohol | 450 |
| Methyl Cellosolve | 300 |
| Ethylene dichloride | 225 |
| Pent acetate | 75 |
| Ethanol | 1125 |
| Butyl Cellosolve | 675 | while the dye formula is as follows:

| | Gms. |
|---|---|
| Methyl red (C concentrated) | 6.444 |
| Methyl blue (MB concentrated) | 10 |
| Methyl yellow (G concentrated) | 12.333 |

The solvents and dyes are thoroughly mixed and placed in a dip-pan and applied by revolving the drum, and thus, rotating the homogeneous base. The base is allowed to dry for at least two hours before applying the dye coat.

The above screen has a neutral density, and by varying the dye coat, will produce different amounts of light reduction, the above formula being that used for bright sunlight to balance normal artificial light in an interior such as illustrated in Fig. 1. That is, the above dye formula provides sixty-five percent absorption of light, only one dye coat being applied at a drum speed of one revolution in ten minutes, the drum having a diameter of approximately five feet, ten inches. To vary the absorption, the drum speed is varied. For instance, to determine the drum speed for a specific value of light absorption, a drum having an approximate circumference of fifteen feet has its speed varied each three feet, thus providing five test strips. This permits a graph of drum speed versus light transmission to be made, the drum being rotated at a constant selected speed for the final screen, the dye being uniformly applied to the entire screen.

If the desired absorption is not within the range of speeds selected for proper application of the dye coat, the dye formula may be strengthened or weakened by proportionately increasing the dye ingredients with respect to the solvents and another series of speed tests made. By comparing the strips with established filters of known absorptions, using the log sector for photo-spectrometer tests, the desired speed of rotation for the drum is determined.

The screen is cut by strings placed under the last coat of the base and then stripped from its matrix and placed in the frame 31 of proper size. It is then ready for use as described above.

I claim:

1. The method of photographing an area at least one portion of which has a normal high intensity of illumination, and another portion of which has a normal low intensity of illumination, comprising illuminating said portion of normal low intensity illumination to an intensity required by the photographic emulsion of any type being used for photographing, and reducing the illumination of said portion having the normal high intensity illumination by a separate removable filter screen between said last mentioned portion and said emulsion, said filter screen reducing light over all wave lengths of the visible spectrum in substantially equal amounts.

2. The method of equalizing the light intensities between two areas to be photographed simultaneously on a certain photographic emulsion of any type, one area having a high light intensity and the other area having a low light intensity, said low light intensity area to be photographed separately with a low light intensity, comprising adjusting the illumination in said low light intensity area to the light intensity value necessary for the proper exposure of said emulsion and filtering with a separate filter screen placed in said high light intensity area adjacent said low light intensity area, all light frequencies to the same degree coming from said high light intensity area to said emulsion to correspond to the adjusted illumination in said low light intensity area, said filter being removed when said area of said low light intensity is photographed separately.

3. The method of equally exposing a photographic emulsion of any type to an action scene, one portion of which is outdoor and illuminated with one light intensity, and another portion of which is indoors and illuminated with a lower light intensity, comprising determining the intensity of illumination of said indoor portion of said scene dependent upon the type of said photographic emulsion, illuminating said portion at said intensity, and inserting a separate filter screen in said outdoor portion adjacent said indoor portion to reduce the light intensity of said outdoor portion as impressed on said emulsion in accordance with the difference between the illuminations of said portions, said filter screen reducing light over all wave lengths of the visible spectrum in substantially equal amounts.

References Cited in the file of this patent

UNITED STATES PATENTS

| Number | Name | Date |
|---|---|---|
| 1,742,680 | Artigue | Jan. 7, 1930 |
| 1,764,490 | Artigue | June 17, 1930 |